United States Patent [19]

Georgiou

[11] Patent Number: 5,285,449

[45] Date of Patent: Feb. 8, 1994

[54] PROTOCOL FOR HYBRID LOCAL AREA NETWORKS

[75] Inventor: Christos J. Georgiou, White Plains, N.Y.

[73] Assignee: International Business Machines Corporation, Armonk, N.Y.

[21] Appl. No.: 679,874

[22] Filed: Apr. 3, 1991

[51] Int. Cl.[5] .............................................. H04J 3/02
[52] U.S. Cl. .................................. 370/85.13; 370/60; 359/136
[58] Field of Search ............... 370/85.13, 85.2, 85.3, 370/85.4, 93, 94.1, 60, 112; 359/115, 118, 136, 116; 379/112

[56] References Cited

U.S. PATENT DOCUMENTS

| | | | |
|---|---|---|---|
| 4,422,179 | 12/1983 | Albanese | 359/136 |
| 4,535,440 | 8/1985 | Mannschke | 359/116 |
| 4,577,313 | 3/1986 | Sy | 370/88 |
| 4,580,011 | 4/1986 | Glaser | 379/112 |
| 4,602,364 | 7/1986 | Herman et al. | 370/85 |
| 4,627,052 | 12/1986 | Hoare et al. | 370/88 |
| 4,630,045 | 12/1986 | Georgiou | 340/825.79 |
| 4,706,081 | 11/1987 | Hart et al. | 370/85.13 |
| 4,707,827 | 11/1987 | Bione et al. | 370/85 |
| 4,715,030 | 12/1987 | Koch et al. | 370/85 |
| 4,731,784 | 3/1988 | Keller et al. | 370/85.5 |
| 4,731,880 | 3/1988 | Ault et al. | 370/85.4 |
| 4,763,317 | 8/1988 | Lehman et al. | 370/60 |
| 4,797,881 | 1/1989 | Ben-Artzi | 370/88 |
| 4,942,623 | 7/1990 | Asawa et al. | 359/116 |

Primary Examiner—Douglas W. Olms
Assistant Examiner—Shick Hom
Attorney, Agent, or Firm—Scully, Scott, Murphy & Presser

[57] ABSTRACT

A hybrid local area network (LAN) for the interconnection of multiple stations. The LAN consists of an N-port non-blocking switch and multiple subnetworks interconnected via passive optical couplers. Each station in the system is attached via a duplex fiber-optic link, either directly to a switch port or to a subnetwork, which in turn, is attached to a switch port. A subnetwork is interconnected by means of a passive optical combiner (incoming lines to the switch port) and a passive optical splitter (outgoing lines from switch port). The LAN is structured in a way that minimizes the delay incurred for communications between the subnetworks. The LAN protocol allows for any-to-any interconnections, multiple simultaneous transmissions, and broadcasting.

39 Claims, 2 Drawing Sheets

PROTOCOL FOR HYBRID LOCAL AREA NETWORKS

BACKGROUND OF THE INVENTION

1. Field of the Invention

The present invention relates generally to a hybrid Local Area Network (LAN) for interconnecting multiple stations, and more particularly pertains to a LAN in which a non-blocking any-to-any switch interconnects one or more passive star subnetworks, with the LAN providing for any-to-any interconnections, multiple simultaneous transmissions, or broadcasting.

2. Discussion of the Prior Art

LANs based on passive optical coupler technology provide a low-cost, high-reliability communications mechanism for interconnecting distributed systems. A potential limitation of this technology, however, is the fan-out limitations of passive optical couplers. Light that enters into an n-input by n-output coupler is split n-ways, effectively being reduced in intensity by a factor of n. The allowable optical power budget between the network transmitters and receivers, for an acceptable bit-error rate operation, determines the maximum size of the network. Under current technological capabilities, for the case of semiconductor type laser transmitters, networks of size 32 stations, and perhaps 64 stations, are possible.

In a distributed computing environment, however, a larger number of stations may require interconnection. In large networks, i.e. with >64 attached stations, the fanout limitations of the optical coupler must be addressed. In addition, the performance characteristics of the network may be degraded because of the shared medium nature of the coupler mechanism that allows only one data transmission to take place at any given time.

In order to solve the above problems, multiple coupler subnetworks may be used, wherein each subnetwork services a subset of the given stations. To allow communication between the subnetworks, a coupling mechanism must be used. In the prior art, the coupling of two LANs is often accomplished via a station, called a bridge, that has interfaces to both LANs, and buffers for storing the messages that are to be transmitted from one LAN to the other. The bridge must have sufficient processing power to handle the protocol of both LANs. The size of the bridge buffers typically depends on message size and the particular protocol used on the LANs. Bridges tend to introduce delays in the store-and-forwarding of messages between LANs, and the additional processing and buffer requirements for handling the message transfer function make them costly.

Some prior art LANs provide for the transmission of data between a plurality of nodes by a technique known as store-and-forwarding, which means that the entire package is stored in an intermediate network node before it is passed on to the next node. The node could be a switch or could be a processor. Store-and-forwarding increases the complexity of the system because packet buffers must be managed, along with pacing control, tracking and recovery of lost packets, etc.

A copending U.S. patent application, Ser. No. 07/429,267 filed on Oct. 30, 1989, by the same assignee as the current application, discloses the use of delimiters to control physical crosspoint connections.

SUMMARY OF THE INVENTION

Accordingly, it is a primary object of the present invention to provide a hybrid LAN for interconnecting multiple stations. The LAN is termed hybrid because of the use therein of switches with couplers.

A further object of the subject invention is the provision of a hybrid LAN which is structured to minimize the delay incurred by communications between subnetworks served by the LAN while allowing any-to-any interconnections, multiple simultaneous transmissions, or broadcasting.

Another object of the present invention is to provide a bridge between multiple subnetworks which exhibits very low latency, and does not require large buffers or specialized programming.

The subject invention provides a hybrid LAN which provides a bridge structure providing non-blocking connections among multiple subnetworks and/or point-to-point links, without using data store-and-forwarding. This is accomplished by a non-blocking switching element or fabric and by input/output ports which are capable of detecting collisions that occur when multiple messages are simultaneously transmitted to a particular input/output port. A bridge structure controller keeps track of the activity at the input/output ports, thereby having the ability to quickly connect two ports, and thus provide a very low latency bridging function.

A preferred embodiment utilizes optical point-to-point links, and optical coupler subnetworks, in which all incoming data traffic from the subnetwork devices to the port is coupled via an optical combiner, and all outgoing data traffic from the port to the subnetwork devices is coupled via an optical splitter. The bridge structure has the capability of supporting multiple independent transmissions occurring simultaneously within any subnetwork, or between any two subnetworks, or between any subnetwork and any point-to-point link, or in a broadcast fashion.

The present invention does not utilize packet forwarding. That is, as soon as a port determines that a connection to a desired destination is established by the switch controller, the packet bits start flowing to the destination. This improves performance and also minimizes complexity, because there is no need to worry about managing packet buffers, pacing control, tracking and recovery of lost packets, etc.

Non-blocking switching is provided by a non-blocking crosspoint matrix switch element, and a switch controller is used to set up and break the connections in the matrix. The switch controller also communicates with the ports to determine whether a request for connection or disconnection has been generated at a port. Alternatively, a time division switch element could be utilized in different embodiments.

More specifically, in the case where a message is sent from one station of a subnetwork to another station in the same subnetwork, the port routes the message from the input (combiner) to the output (splitter) and sets up a flag indicating that it is busy. When the message transmission ends, the flag is cleared.

In the case where the message is sent between subnetworks, the source port stores the beginning of the message in an elastic buffer (whose size depends on the maximum port delay in servicing the port) and raises a request flag to the switch controller. The switch controller accesses the port, receives the destination information, checks the destination port to see that is is not busy and sets up the switch matrix. Then it sends a go-ahead message to the source port.

If the destination port is busy, the switch controller sends a destination busy message to the source port, which in turn sends a message to the subnetwork station to postpone the transmission and try again later.

In accordance with the teachings and claims herein, the present invention provides a hybrid LAN for providing non-blocking connections without data message store and forwarding, and comprising a plurality of ports interconnected by a switching element. Each port has the capability of detecting collisions between data messages transmitted therethrough. Subnetwork can be connected to the ports, with each subnetwork being used to provide connections to a number of internal stations served thereby. A switch controller is provided for controlling connections provided by the switching element so that data messages can be routed between the ports and within the subnetworks. Each subnetwork is provided with an optical coupler for transmitting data messages between the stations. Each subnetwork optical coupler includes an optical splitter for splitting data messages from the port to the subnetwork devices, and an optical combiner for transmitting all data messages from the subnetwork devices.

The switching element comprises a non-blocking switching element, and can be a crosspoint matrix switching element or a time division switch element. The switch controller keeps track of the activities at the input/output ports by flags from the ports, thereby providing the controller with the ability to quickly connect two ports, and provide a very low latency bridging function.

In the case where a data message is sent from one station of a subnetwork to another station in the same subnetwork, each port routes the message from the input (combiner) to the output (splitter) and sets up a flag indicating to the switch controller that it is busy, and when the message transmission ends, it clears the flag. A device that wants to transmit within its subnetwork listens for ongoing data transmissions, and if no data transmission is taking place, transmits its data message, which is received at the port and is routed by the logic of the port to the destination address found in a data message header. If there is a collision because two devices in a subnetwork simultaneously start transmissions, the collision is detected at the port, and the colliding bit-streams are wrapped back to the subnetwork. Upon detecting the collision, the transmitting devices cease their transmission and establish a predetermined transmission sequence through token passing, wherein the token is a message of a few bytes with a particular header address that is wrapped at the port without switch controller intervention.

In the case where a data message is sent between subnetworks, a source port stores the beginning of the message in an elastic buffer and raises a request flag to the switch controller which accesses the port, receives the destination information, checks the destination port to see that it is not busy, sets up the switch matrix, and then sends a go-ahead message to the source port. If the destination port is busy, the switch controller sends a destination busy message to the source port, which in turn, sends a message to the subnetwork station to postpone the attempted transmission and retry later. If a data message is directed outside the subnetwork, idle characters, or a special character, or a copy of the message itself, are transmitted by the port to the subnetwork to indicate to the other subnetwork devices a subnetwork busy condition.

Each port includes an optoelectronic transmitter, an optoelectronic receiver, a data transmitter, a data receiver, and a command decode and control logic circuit which communicates with the switch controller. Each port further includes a phase lock loop circuit at the output of the optoelectronic receiver, and an elastic buffer at the output of the phase lock loop circuit.

The present invention also provides a method of transmitting data messages between stations of a hybrid local area communications network having a number of subnetworks and stations, and a switch element, with each port of the network having one of the subnetworks or one of the stations connected thereto. The method comprises the steps of monitoring for data messages within each subnetwork having a message to transmit within that subnetwork, and transmitting from a first station to a second station of the subnetwork if no message is found on the subnetwork. Messages are transmitted from a first port to a second port of the local area network through corresponding connections in the switch element, and idle characters are transmitted between frames containing the data messages to indicate a busy condition of the first and second ports and the corresponding connection. A reject message is transmitted to a source station or subnetwork when there is a busy condition on a port to which the source station or subnetwork has a message to transmit, with the reject message indicating that the source station or subnetwork cannot transmit its message.

BRIEF DESCRIPTION OF THE DRAWINGS

The foregoing objects and advantages of the present invention for a protocol for hybrid local area networks (LANs) may be more readily understood by one skilled in the art with reference being had to the following detailed description of a preferred embodiment thereof, taken in conjunction with the accompanying drawings wherein like elements are designated by identical reference numerals throughout the several views, and in which.

DETAILED DESCRIPTION OF THE DRAWINGS

Figure 1:
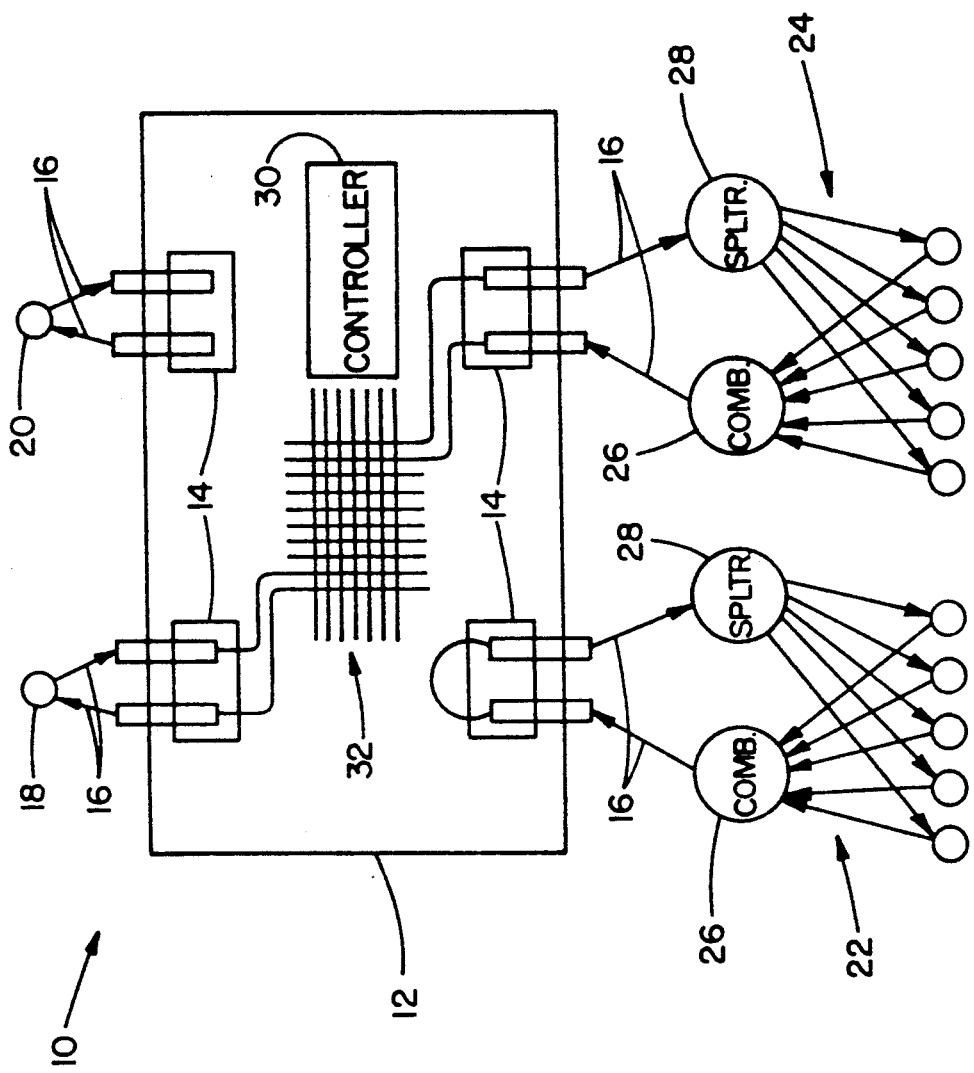
FIG. 1 illustrates an exemplary embodiment of a hybrid LAN constructed pursuant to the teachings of the present invention.

Referring to the drawings in detail, FIG. 1 illustrates an exemplary embodiment of a hybrid LAN 10 constructed pursuant to the teachings of the present invention. The LAN 10 consists of an n-port non-blocking switch 12 and multiple subnetworks connected to ports 14 of the LAN via passive optical couplers 26, 28. Each station in the system is attached via a duplex fiber-optic link 16, either directly to a switch port, as in the case of stations 18, 20, or to a subnetwork, as shown at 22, 24, which in turn is attached to a switch port 14. A subnetwork is interconnected by means of a passive optical combiner 26 (incoming lines to the switch port) and a passive optical splitter 28 (outgoing lines from switch port). A switch controller 30 sets up connections through the matrix 32 between source and destination ports 14. A request for setting up a connection can be received at a port 14 either from a subnetwork 22, 24, or from a station 18, 20 directly connected to the switch.

The controller 30 accesses the switch ports to receive the connection/disconnection requests. In different embodiments, the switch 32 can be a crossbar or time division switch element.

The construction and operation of the optical combiner 26 and the optical splitter 28 are well known in the art. The optical splitter 28 simply splits the optical signal into n parts and directs one split component to each subnetwork station. Each station has a unique address code, and if the incoming address code matches that of the station, the signal is received, and if it does not the signal is ignored. The optical combiner 26 simply combines all incoming optical signals at the station and passes that signal on. If multiple signals are received at the same time, a collision will occur, which is detected as described in more detail hereinbelow.

Figure 2:
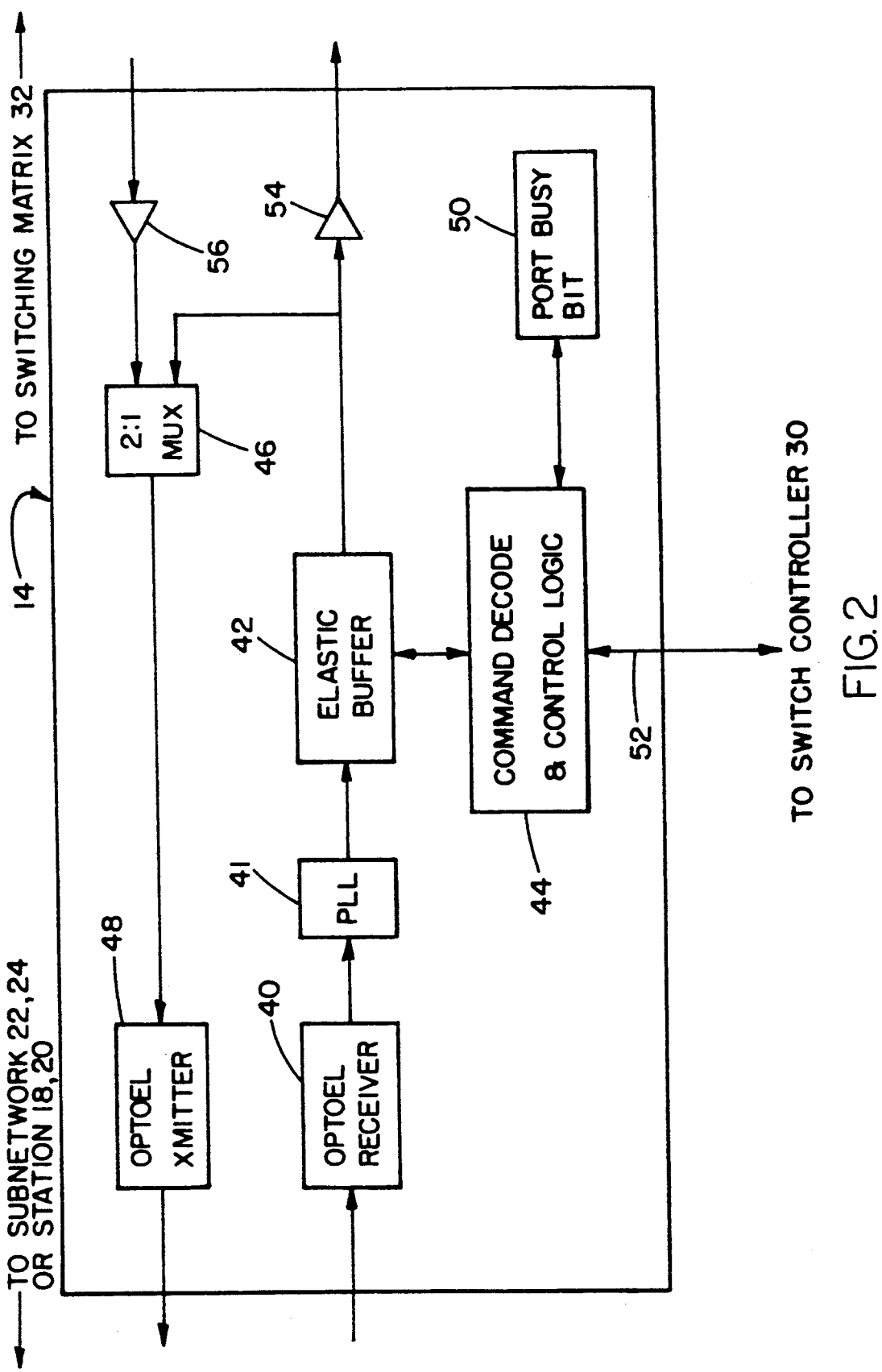
FIG. 2 illustrates an exemplary circuit for one of the switch ports in the hybrid LAN of FIG. 1.

FIG. 2 illustrates an exemplary circuit for one of the switch ports 14. An incoming optical bit stream is converted to electric pulses at an optoelectronic receiver 40 which are transmitted through a Phase Lock Loop (PLL) 41, and temporarily stored into an elastic buffer 42. A port command decode and control logic 44 determines from the header of the received message whether it is a request for connection, and to which station or port the message is directed. If the message is directed to a station in the same subnetwork, the port control logic 44 controls the 2:1 multiplexer (MUX) 46 to direct the message in the elastic buffer 42 to an optoelectronic transmitter 48 and then back to the subnetwork in a wrap around operation. At the same time it sets the Port Busy bit or flag at 50. At the end of the transmitted message, the Port Busy bit or flag at 50 is reset.

If the data message is directed to another port, the control logic 44 controls the MUX switch 46 to assume a position in which it passes the output from a receiver 56, such that the data message from the elastic buffer 42 is then directed to a data transmitter 54.

The phase lock loop (PLL) circuit 41 synchronizes the frequency of the PLL output signal to the frequency of the bit pulse stream received from the optoelectronic receiver 40, which is usually the frequency of the system clock, but may deviate therefrom by a small $\Delta f$. The PLL circuit also detects a collision between data messages, by losing synchronism when a collision occurs, which is signaled to the command decode and control logic 44, which controls the MUX 46 to forward the colliding pulse trains through optoelectronic transmitter 48 and through optical splitter 28 back to the subnetwork elements which are transmitting. The subnetwork elements themselves then detect the collision, and the newly added transmitter which caused the collision by attempting to transmit over a busy line terminates its attempt to transmit and tries again at a later time.

Collisions can also be detected by the code in the data stream, which should contain only valid characters. If an invalid character is received, it would normally indicate to the receiving station that a collision has occurred between data messages.

While a port is in a local wrap mode, the switch controller 30 may want to connect that port to another switch port. The switch controller will first check the Port Busy bit 50 and abort the request. If a message received at a port is directed to another switch port 14, the port control logic 44 raises an attention flag at 52 to the matrix controller 30. The controller 30 then accesses the port to receive the destination address and proceeds to determine whether the destination port is not busy. If not, it then makes the connection in the switching matrix 32 and sends a go-ahead signal to the source port to start transmitting the message that has been accumulating in the elastic buffer 42. The delay through the port 14 can be minimal, particularly if it is a local wrap. In cases where the matrix controller 30 is involved, the delay depends on how fast the controller can service the ports. This can be made to be very fast, as for example, by U.S. Pat. No. 4,630,045, C.J. Georgiou, for a Controller for a Cross-Point Switching Matrix. Signals to and from the switching matrix 32 pass through respectively a receiver amplifier/buffer circuit 54 and a transmitting amplifier/buffer circuit 56, the constructions of which are well known in the art and normally includes a master/slave latching arrangement.

Protocol Description

There are various possibilities for communication:
1. Station-to-station in the same subnetwork 22 or 24;
2. Station in one subnetwork 22 or 24 to station in another subnetwork 24 or 22;
3. Station in a subnetwork 22 or 24 to a directly attached station 18 or 20;
4. Directly attached station 18 or 20 to a station in a subnetwork 22 or 24; or
5. Broadcasting The protocol details for the above cases are described in the following paragraphs.

Case 1

Station-to-Station in the Same Subnetwork

This case is handled via a combination of Collision Sense Multiple Access (CSMA) and token passing protocols. A station that wishes to transmit listens for traffic in the subnetwork. When it detects no on-going traffic, it transmits its message with a "connect locally" indication in the header. The Command Decode and Control Logic 44 in the switch port 14 reads the header and wraps the message back into the subnetwork. At the same time, the switch controller 30 updates a port connection table entry for that port to "busy." At the end of transmission, a disconnect delimiter is sent. The port breaks the port-wrap and updates the connection table.

If there was a collision because two stations in the same subnetwork by initiating transmissions simultaneously, the switch port will be able to detect the collision either by coding errors, or by loss of PLL 41 synchronization. In that case, it will wrap the port around, if it has not already done so. The stations in the subnetwork will also detect the collision and will stop the transmissions. Then, they will establish an order of transmission, by passing a token around in a predetermined sequence. The token passing will last for only one cycle, during which the collided stations will transmit their messages. After the cycle is complete, the protocol will become CSMA again.

Case 2

Station in One Subnetwork to a Station in Another Subnetwork

The station transmits a message with the address of the destination switch port in its header. The switch 12 makes the connection to the destination subnetwork. During the time that a connection between the two subnetworks is active in the switch, no other transmissions can be initiated in the subnetworks. This can be established by transmitting idle characters in between frames. The switch connection is broken upon detection of an end-of-frame delimiter. If the destination subnetwork is busy, a reject message is transmitted to the source subnetwork and no connection is established in the switch.

Cases 3, 4

Station in a Subnetwork to a Directly Attached Station (or Vice Versa)

These cases are handled similarly to case 2. Idles are also transmitted in between frames to minimize collisions.

Case 5

Broadcasting

Broadcasting is handled as follows: Any station in the system can issue a broadcast request to the switch 12. The switch receives the request and, if there are no on-going transmissions, sends a "go-ahead" message to the requester. During the broadcast transmission, the switch does not establish any new connections (i.e. it returns "busy" reject frames and disables the port wrap function).

If there are on-going transmissions, the switch places the requestor on hold and waits for termination of transmission. Any new requests for connection during this period are also rejected.

The waiting time for the broadcast transmission in the hybrid LAN is no worse than that of any other shared medium LAN (i.e. bus, ring, etc.), because in those LANs, the broadcast requestor must also wait for the end of an ongoing transmission before starting the broadcast.

While several embodiments and variations of the present invention for a protocol for hybrid local area networks are described in detail herein, it should be apparent that the disclosure and teachings of the present invention will suggest many alternative designs to those skilled in the art.

Having thus described our invention, what we claim as new and desire to secure by letters patent is:

1. A local area network for providing non-blocking connectivity without data message store and forwarding comprising:
   a. a switching element;
   b. a plurality of ports interconnectable through said switching element, with each port having means for detecting collisions between data messages transmitted therethrough;
   c. at least one subnetwork connected to one of said ports and having at least one computer equipment station served by the subnetwork, with each subnetwork being used to provide connections to a number of stations served by the subnetwork;
   d. a switch controller means for controlling connections procided by said switching element so that data messages can be routed between said ports and within said subnetworks; and
   e. further wherein each subnetwork has an optical coupler for transmitting data messages for stations for which it provides connections, each subnetwork optical coupler comprising an optical splitter for transmitting data messages from the port to the subnetwork devices, and an optical combiner for coupling all incoming data messages from the subnetwork devices.

2. A local area network as recited in claim 1, wherein said switching element comprises a non-blocking switching element.

3. A local area network as recited in claim 2, wherein said non-blocking switching element comprises a crosspoint matrix switching element.

4. A local area network as recited in claim 2, wherein said non-blocking switching element comprises a time division switch element.

5. A local area network as recited in claim 1, said switch controller keeping track of the activities at the input/output ports by flags from the ports, thereby providing the ability to quickly connect two ports, and provide a very low latency bridging function.

6. A local area network as recited in claim 1, said network supporting multiple independent transmissions occurring simultaneously within any subnetwork, or between any two subnetworks, or between any subnetwork and any point-to-point link, or in a broadcast fashion.

7. A local area network as recited in claim 1, wherein in the case where a data message is sent from one station of a subnetwork to another station in the same subnetwork, each port routes the message from the input (combiner) to the output (splitter) and sets up a flag indicating that it is busy, and when the message transmission ends, clearing the flag.

8. A local area network as recited in claim 1, wherein each port includes an optoelectronic transmitter, an optoelectronic receiver, a data transmitter, and a data receiver.

9. A local area network as recited in claim 8, wherein each port includes a command decode and control logic circuit which communicates with said switch controller.

10. A local area network as recited in claim 8, wherein each port includes a phase lock loop circuit at the output of said optoelectronic receiver, and an elastic buffer at the output of said phase lock loop circuit.

11. A local area network as recited in claim 1, wherein a device that wants to transmit within a subnetwork listens for ongoing data transmissions, and if no data transmission is taking place, transmits its data message, which is received at the port and is routed by the switch controller to the destination address found in a data message header.

12. A local area network as recited in claim 1, wherein if a data message is directed outside the subnetwork, idle characters, or a special character, or a copy of the message itself, are transmitted by the port to the subnetwork to indicate to the other devices a subnetwork busy condition.

13. A local area network as recited in claim 1, wherein if a request for a broadcast is received at a port, the switch controller temporarily disables the portwrap function, thus preventing other messages from interfering with the broadcast.

14. A local area network for providing non-blocking connectivity without data message store and forwarding comprising:
   a. a switching element;
   b. a plurality of ports interconnectable through said switching element, with each port having means for detecting collisions between data messages transmitted therethrough;
   c. at least one subnetwork connected to one of said ports and having at least one computer equipment station served by the subnetwork, with each subnetwork being used to provide connections to a number of stations served by the subnetwork;

d. a switch controller means for controlling connections provided by said switching element so that data messages can be routed between said ports and within said subnetworks; and e. further wherein in the case where a data message is sent between subnetworks, a source port stores the beginning of the message in an elastic buffer and raises a request flag to the switch controller means which accesses the port, receives the destination information, checks the destination port to see that it is not busy, sets up the switch matrix, and then sends a go-ahead message to the source port, and if the destination port is busy, the switch controller means sends a destination busy message to the source port, which in turn, sends a message to the subnetwork station to abort the attempted transmission and retry later.

15. A local area network as recited in claim 14, wherein said switching element comprises a non-blocking switching element.

16. A local area network as recited in claim 15, wherein said non-blocking switching element comprises a crosspoint matrix switching element.

17. A local area network as recited in claim 15, wherein said non-blocking switching element comprises a time division switch element.

18. A local area network as recited in claim 14, said switch controller keeping track of the activities at the input/output ports by flags from the ports, thereby providing the ability to quickly connect two ports, and provide a very low latency bridging function.

19. A local area network as recited in claim 14, said network supporting multiple independent transmissions occurring simultaneously within any subnetwork, or between any two subnetworks, or between any subnetwork and any point-to-point link, or in a broadcast fashion.

20. A local area network as recited in claim 14, wherein in the case where a data message is sent from one station of a subnetwork to another station in the same subnetwork, each port routes the message from the input to the output and sets up a flag indicating that it is busy, and when the message transmission ends, clearing the flag.

21. A local area network as recited in claim 14, wherein each port includes an optoelectronic transmitter, an optoelectronic receiver, a data transmitter, and a data receiver.

22. A local area network as recited in claim 21, wherein each port includes a command decode and control logic circuit which communicates with said switch controller.

23. A local area network as recited in claim 21, wherein each port includes a phase lock loop circuit at the output of said optoelectronic receiver, and an elastic buffer at the output of said phase lock loop circuit.

24. A local area network as recited in claim 14, wherein a device that wants to transmit within a subnetwork listens for ongoing data transmissions, and if no data transmission is taking place, transmits its data message, which is received at the port and is routed by the switch controller to the destination address found in a data message header.

25. A local area network as recited in claim 14, wherein if a data message is directed outside the subnetwork, idle characters, or a special character, or a copy of the message itself, are transmitted by the port to the subnetwork to indicate to the other devices a subnetwork busy condition.

26. A local area network as recited in claim 14, wherein if a request for a broadcast is received at a port, the switch controller temporarily disables the portwrap function, thus preventing other messages from interfering with the broadcast.

27. A local area network for providing non-blocking connectivity without data message store and forwarding comprising:

a. a switching element;

b. a plurality of ports interconnectable through said switching element, with each port having means for detecting collisions between data messages transmitted therethrough;

c. at least one subnetwork connected to one of said ports and having at least one computer equipment station served by the subnetwork, with each subnetwork being used to provide connections to a number of stations served by the subnetwork; and d. a switch controller means for controlling connections provided by said switching element so that data messages can be routed between said ports and within said subnetworks; and e. further wherein if there is a collision because two devices in a subnetwork simultaneously start transmissions, the collision is detected at the port, and the colliding bit-streams are wrapped back to the subnetwork, and where upon detecting the collision, the transmitting devices cease their transmission and establish a predetermined transmission sequence through token passing, wherein the token is a message of a few bytes with a particular header address that is wrapped at the port without switch controller means intervention.

28. A local area network as recited in claim 27, wherein said switching element comprises a non-blocking switching element.

29. A local area network as recited in claim 28, wherein said non-blocking switching element comprises a crosspoint matrix switching element.

30. A local area network as recited in claim 28, wherein said non-blocking switching element comprises a time division switch element.

31. A local area network as recited in claim 27, said switch controller keeping track of the activities at the input/output ports by flags from the ports, thereby providing the ability to quickly connect two ports, and provide a very low latency bridging function.

32. A local area network as recited in claim 27, said network supporting multiple independent transmissions occurring simultaneously within any subnetwork, or between any two subnetworks, or between any subnetwork and any point-to-point link, or in a broadcast fashion.

33. A local area network as recited in claim 27, wherein in the case where a data message is sent from one station of a subnetwork to another station in the same subnetwork, each port routes the message from the input to the output and sets up a flag indicating that it is busy, and when the message transmission ends, clearing the flag.

34. A local area network as recited in claim 27, wherein each port includes an optoelectronic transmitter, an optoelectronic receiver, a data transmitter, and a data receiver.

35. A local area network as recited in claim 34, wherein each port includes a command decode and control logic circuit which communicates with said switch controller.

36. A local area network as recited in claim 34, wherein each port includes a phase lock loop circuit at the output of said optoelectornic receiver, and an elastic buffer at the output of said phase lock loop circuit.

37. A local area network as recited in claim 27, wherein a device that wants to transmit within a subnetwork listens for ongoing data transmissions, and if no data transmission is taking place, transmits its data message, which is received at the pot and is routed by the switch controller to the destination address found in a data message header.

38. A local area network as recited in claim 27, wherein if a data message is directed outside the subnetwork, idle characters, or a special character, or a copy of the message itself, are transmitted by the port to the subnetwork to indicate to the other devices a subnetwork busy condition.

39. A local area network as recited in claim 27, wherein if a request for a broadcast is received at a port, the switch controller temporarily disables the port-wrap function, thus preventing other messages from interfering with the broadcast.

* * * * *

UNITED STATES PATENT AND TRADEMARK OFFICE
CERTIFICATE OF CORRECTION

PATENT NO. : 5,285,449
DATED : February 8, 1994
INVENTOR(S) : Christos J. Georgiou It is certified that error appears in the above-indentified patent and that said Letters Patent is hereby corrected as shown below:

Column 1, line 15; "LANs based on passive" should begin on line 16.

Column 7, line 58, Claim 1: "procided" should read --provided--

Column 11, line 14, Claim 37: "pot" should read --port--

Signed and Sealed this

Sixteenth Day of August, 1994

BRUCE LEHMAN

Attest:

Attesting Officer

Commissioner of Patents and Trademarks